United States Patent [19]

Stedman et al.

[11] Patent Number: 5,207,453
[45] Date of Patent: May 4, 1993

[54] ADD-ON STRUCTURE FOR VEHICLE SHOULDER BELT

[76] Inventors: Dennis F. Stedman, 1610 N. Hadley Rd., Ortonville, Mich. 48462; Stuart A. Ehrhardt, 9963 Walnut Hill Dr., Davisburg, Mich. 48350; Roy A. Carlstrom, 20280 S.W. 93rd Lane Rd., Dunnellon, Fla. 32630; Robert A. Choinard, 8738 Shannon, Sterling Heights, Mich. 48314; Gerald H. Gillett, 8351 Pamela St., Utica, Mich. 48316; Raymond N. Kreucher, Jr., 15051 Elrond Dr., Sterling Heights, Mich. 48313; John S. Latimer, II, 5053 Bantry Dr., West Bloomfield, Mich. 48322

[21] Appl. No.: 862,477

[22] Filed: Apr. 2, 1992

[51] Int. Cl.$^5$ .............................. B60R 22/18
[52] U.S. Cl. ............................ 280/808; 296/30
[58] Field of Search ............... 280/801, 808; 296/30, 296/63, 68.1, 186, 195, 198

[56] References Cited

U.S. PATENT DOCUMENTS

| | | | |
|---|---|---|---|
| 3,494,633 | 2/1970 | Malloy | 280/808 X |
| 4,026,494 | 5/1977 | Tanaka | 242/107.4 RX |
| 4,350,369 | 9/1982 | Chika | 280/808 X |
| 4,457,555 | 7/1984 | Draper | 296/30 X |
| 4,512,604 | 4/1985 | Maeda et al. | 296/68.1 |
| 4,669,774 | 6/1987 | Crain | 296/136 |
| 4,863,190 | 9/1989 | Tokarz et al. | 280/808 |
| 4,971,359 | 11/1990 | Takahashi et al. | 280/808 |
| 4,988,121 | 1/1991 | Yoshii | 280/808 |

FOREIGN PATENT DOCUMENTS

| | | | |
|---|---|---|---|
| 3719656 | 12/1987 | Fed. Rep. of Germany | 280/801 |
| 0231247 | 9/1990 | Japan | 280/801 |

Primary Examiner—Brian Johnson
Attorney, Agent, or Firm—Edward P. Barthel

[57] ABSTRACT

An add-on structural support arrangement for a convertible-type vehicle rear passenger shoulder belt system comprising a pair of mirror image composite pillars fixedly disposed at each rear corner of the rear seat compartment. Each pillar includes three vertically elongated sheet metal members, i.e. a forward seat attaching panel member, an intermediate anchor panel member, and an aft channel member, substantially coextensive in length and welded in flatwise abutment. A horizontal tie bar interconnects the upper ends of the forward panel members, while lower oblique wing of each anchor panel member is bolted to an associated portion of the body floor pan. A shoulder belt retractor is mounted on a lower rear face of each pillar while each aft channel member provides a vertically extending guideway for passage for its associated shoulder belt. The anchor panel is formed with a U-section in cross-sectional view defining a pair of side flanges each provided with a midpoint attachment ear. A trailing V-shaped brace, comprising a pair of inboard and outboard rearwardly convergent straps, has each of its forward laterally spaced strap ends secured to an associated anchor panel member ear while the strap mating aft portions are attached to an associated rear wheelhouse inner panel.

6 Claims, 5 Drawing Sheets

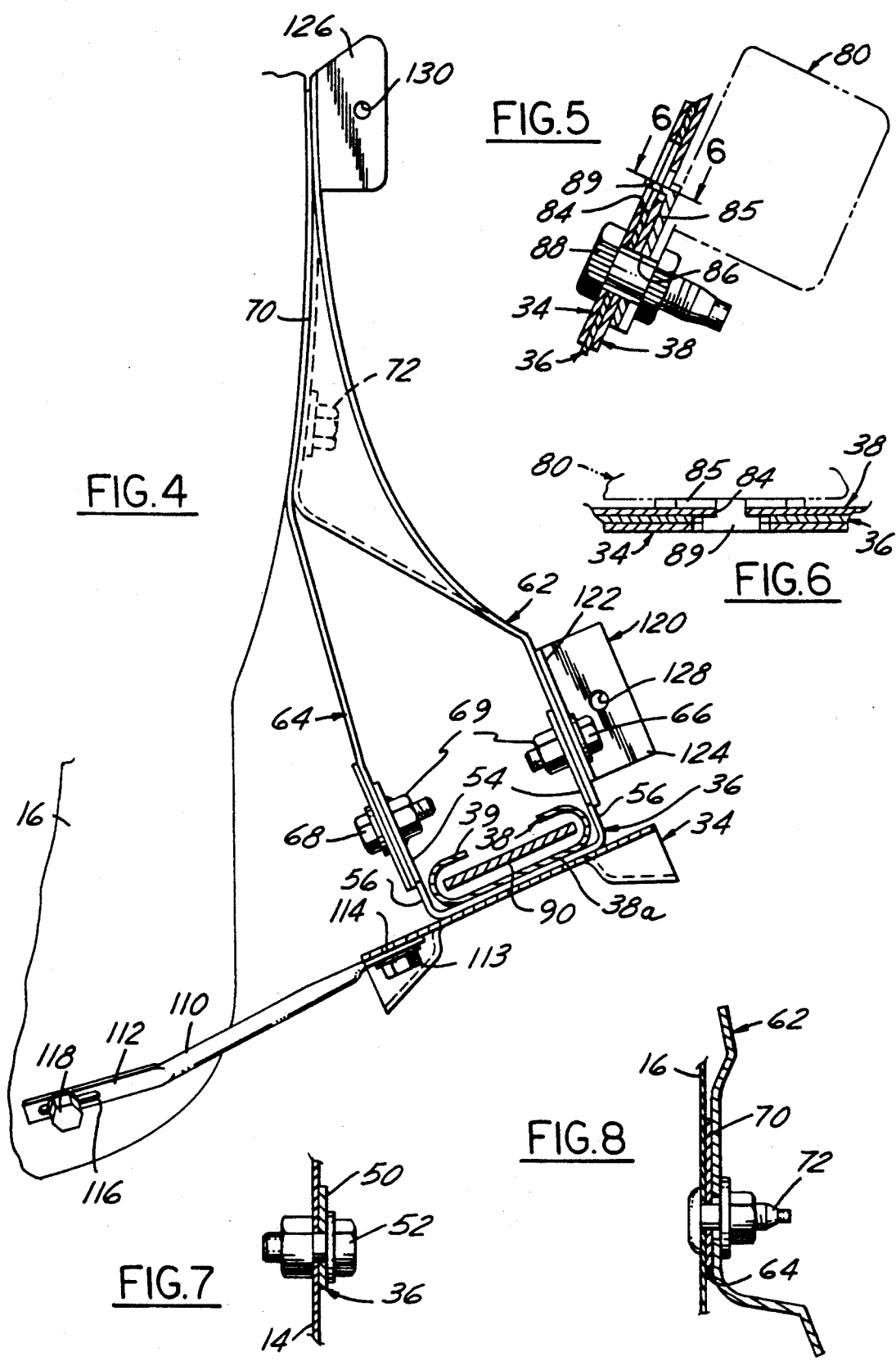

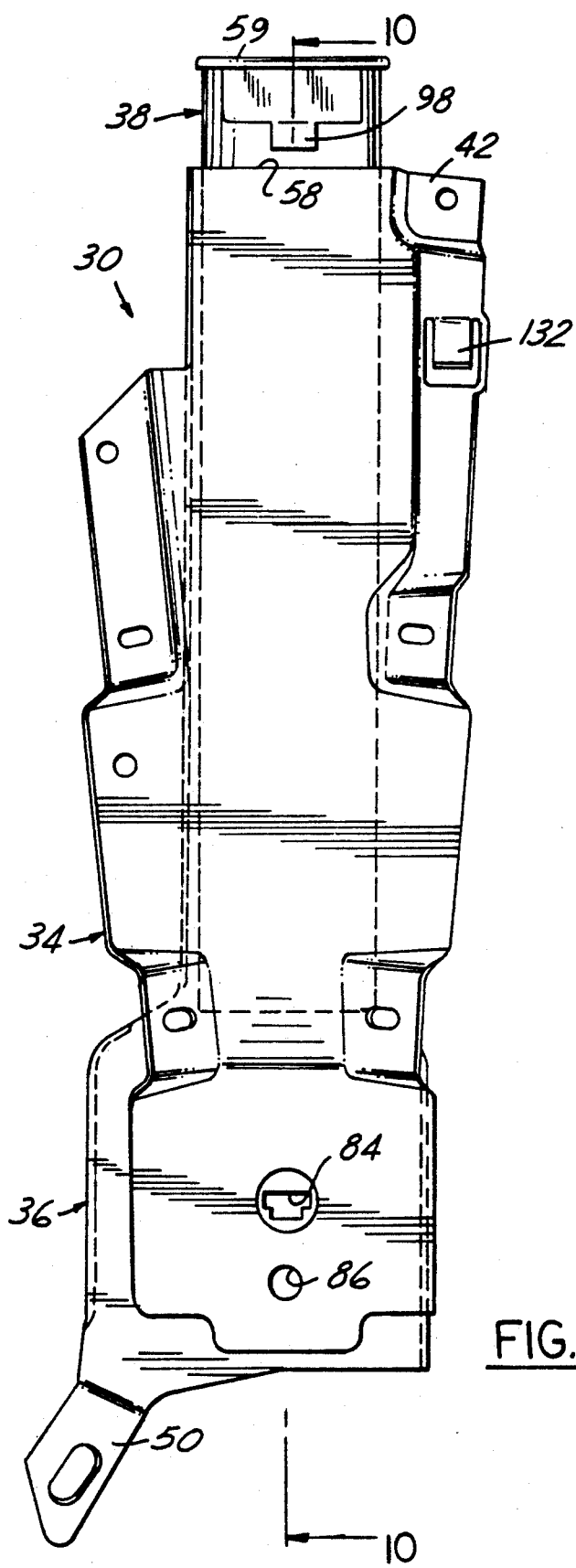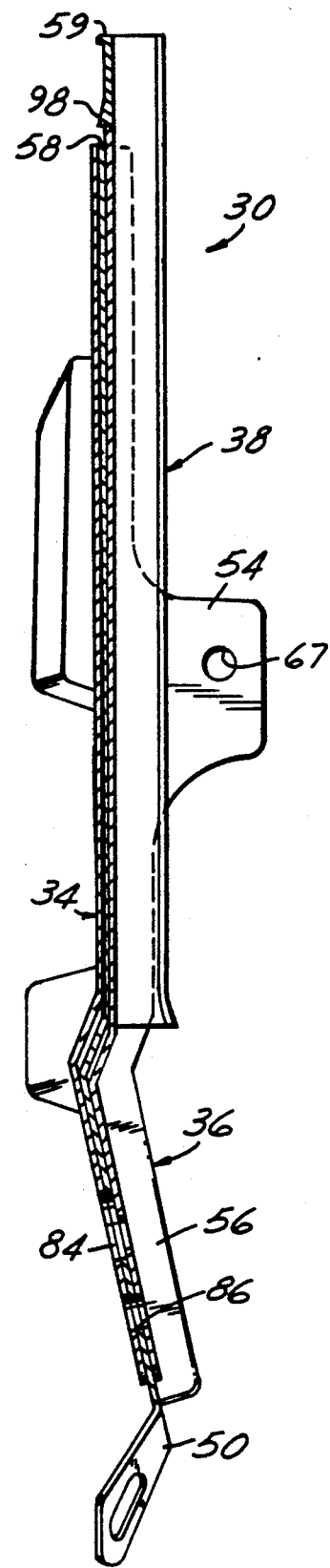
FIG.9
FIG.10

ADD-ON STRUCTURE FOR VEHICLE SHOULDER BELT

BACKGROUND OF THE INVENTION

This invention relates to automotive restraint systems and more particularly to an add-on structural arrangement for a rear shoulder belt system for convertible-type vehicles.

Several patents disclose seat belt reinforcements for body structures of open-top or convertible-type vehicles. One example is the U.S. Pat. No. 4,863,190 issued Sep. 5, 1989 to Tokarz et al. entitled Passive Restraint For Convertible-Type Vehicles. The Tokarz patent discloses a three-point passive restraint system for a convertible vehicle providing a first shoulder belt retractor and a lap belt retractor mounted interiorly of the vehicle onto the inner door structure thereof.

The U.S. Pat. No. 4,988,121 issued Jan. 29, 1991 to Yoshii entitled Seat Belt Device For Open-Top Vehicle discloses a support device in the form of a closed cross-sectional structure mounted on a rear body portion of a convertible-type vehicle. The support device, located rearward of the rear seat where a convertible roof structure is retracted, carries the seat belt and an extension. The extension projects rearwardly from the support device, which is fixed to the rear body portion, enabling the belt to be drawn out forwardly to securely fasten a passenger.

SUMMARY OF THE INVENTION

It is an object of the present invention to provide an add-on seat restraint support arrangement for a convertible-type vehicle body wherein a passenger can be safely fastened by a shoulder belt device with a minimal increase in the weight of the vehicle body.

It is another object of the present invention to provide a convertible-type vehicle body with an add-on restraint support arrangement for shoulder belt retractor devices affording sufficient reinforcement to absorb bending and torsional loads applied by left and right rear seat occupant shoulder belt systems.

It is a further object of the present invention to provide an add-on restraint support arrangement which can be readily incorporated in a rear body portion of a convertible-type vehicle which modification is accomplished from the interior of the body during an assembly line procedure thereby requiring a minimum of time and labor.

It is a still further object of the present invention to provide an add-on restraint support arrangement for a convertible-type vehicle comprising a pair of mirror image composite pillars fixedly secured at each rear corner of the vehicle passenger compartment. Each composite pillar, which is adapted to support the vehicle rear seat back, includes a forward panel member, an intermediate anchor panel member, and an aft channel member each formed from sheet metal stock and secured together in a flatwise manner as by welding. The three members of each pillar are substantially coextensive in height except that the aft channel member projects above the forward and intermediate members to a predetermined location adjacent the upper edge of the vehicle seat back. A tubular sleeve trim closure is received on the channel member upper end while a shoulder belt retractor is mounted on a rearward face adjacent the lower end of each composite pillar. A transversely extending tie bar interconnects each upper end of the pair of composite pillars.

Each pillar anchor member has a U-shape in cross section defining aft-turned side flanges each formed with an integral attachment ear adjacent the midpoint of each pillar. A generally V-shaped trailing brace comprises a pair of rearwardly convergent sheet metal straps terminating in an aft merged portion. Each strap has its forward end fastened to a respective anchor member ear while the brace aft merged portion is secured to an associated rear wheelhouse inner panel. An obliquely outboard projecting apertured tail portion, formed on the lower end of the pillar anchor member, is fastened to an upstanding toe plate portion of the floor pan.

The arrangement permits each retractor shoulder belt to be fed upwardly for passage through its aft guide channel, the open lower end, its closure trim member, and thence forwardly through a belt passage in the trim closure upper end. The belt then may be placed over the relevant shoulder of an occupant with the belt free end being secured to the vehicle body thereby providing a shoulder belt for the occupant.

BRIEF DESCRIPTION OF THE DRAWINGS

These and other object, features and advantages of the present invention will appear from the following written description and accompanying drawings in which:

FIG. 4 is an enlarged fragmentary horizontal cross sectional view taken substantially on the line 4—4 of FIG. 2;

FIG. 5 is an enlarged fragmentary vertical cross sectional view taken on the line 5—5 of FIG. 2;

FIG. 6 is an enlarged fragmentary view taken on the line 6—6 of FIG. 5;

FIG. 7 is an enlarged fragmentary vertical cross sectional view taken on the line 7—7 of FIG. 2;

FIG. 8 is an enlarged fragmentary cross sectional view taken on the line 8—8 of FIG. 2;

FIG. 9 is an enlarged front detail view of the right hand composite pillar of the structural sub-assembly;

FIG. 10 is an enlarged side detail view of the composite pillar of FIG. 9;

DESCRIPTION OF THE INVENTION

Figure 1:
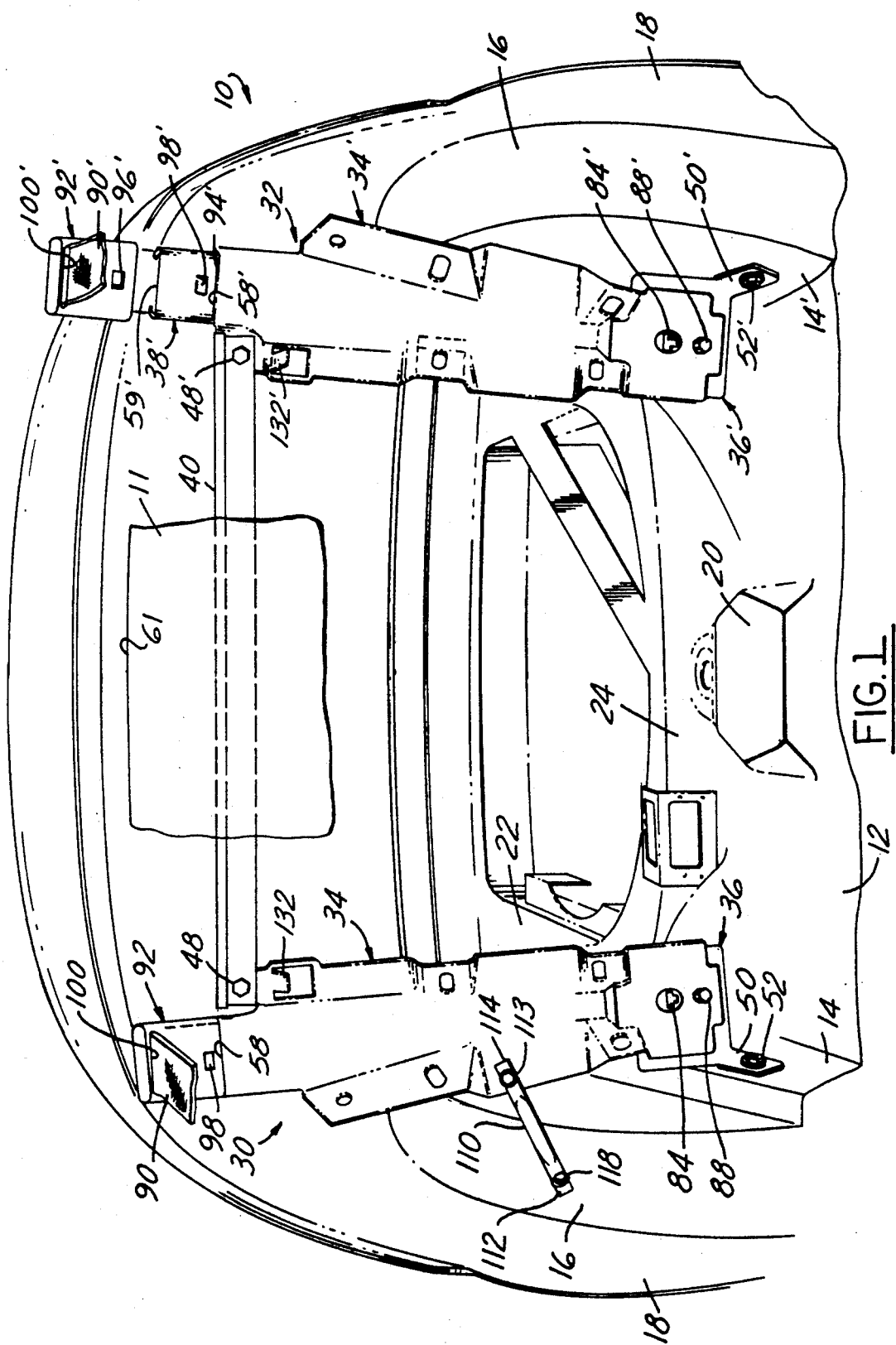
FIG. 1 is a fragmentary perspective view of a rear body portion interior of a convertible-type vehicle showing an add-on structural sub-assembly for rear passenger seat belt restraints according to the present invention.

Referring now to the drawings, and specifically to FIG. 1, there is shown a perspective view of a rear body portion of an open-top or convertible vehicle body 10 adapted to receive a conventional rear bench seat including a seat cushion and a seat back which is partially shown at 11. The U.S. Pat. No. 4,669,774 issued Jun. 2, 1987 to Crain shows a typical convertible rear seat arrangement, the disclosure of which is incorporated by reference herein.

In FIG. 1 the vehicle body 10 is shown providing a passenger compartment front sheet metal floor pan 12 including a pair of opposite overlying sheet metal reinforcement end portions including upstanding toe wall or plate portions 14. Each toe plate portion 14, which conforms to its subjacent side rail (not shown) and floor pan portions for welding thereto, extends in a longitudinal direction along an intermediate portion of the vehicle body. A pair of rear wheelhouse inner panels 16 constitute opposite outer surfaces of an aft side body portion rearward of side door openings 18. The floor pan 12 further includes a longitudinally extending downwardly opening tunnel 20, disposed centrally of the vehicle body, which terminates at its rearward end in a slightly elevated deck 22. The deck 22 is shown merging with the tunnel 20 and forming a floor pan cross riser 24. Reference may be had to U.S. Pat. No. 4,457,555 issued Jul. 3, 1984 to Draper which discloses a typical convertible type vehicle body floor pan reinforcement end portions similar to the above mentioned reinforcement end portion. The disclosure of the Draper patent is incorporated by reference herein.

FIG. 1 illustrates a pair of mirror image right hand and left hand upstanding composite pillars 30 and 32, respectively, providing support of shoulder belt restraints for two passengers seated on right and left halves of the seat back 11. Each composite pillar 30 and 32 together with a tie bar to be described, forms add-on structural support arrangement. Each composite pillar is fixedly mounted at a respective aft corner of the passenger rear compartment enabling a shoulder belt load to be transmitted thereto. The aft corner locations are defined, in part, by the outboard end of the floor pan cross riser 24 at its juncture with its associated side reinforcement toe plate 14. As each of the handed composite pillars are the same only the right hand pillar 30 will be described in detail and like or corresponding portions of the left hand composite pillar 32 will be identified by the same reference numbers except that they will be primed.

Figure 2:
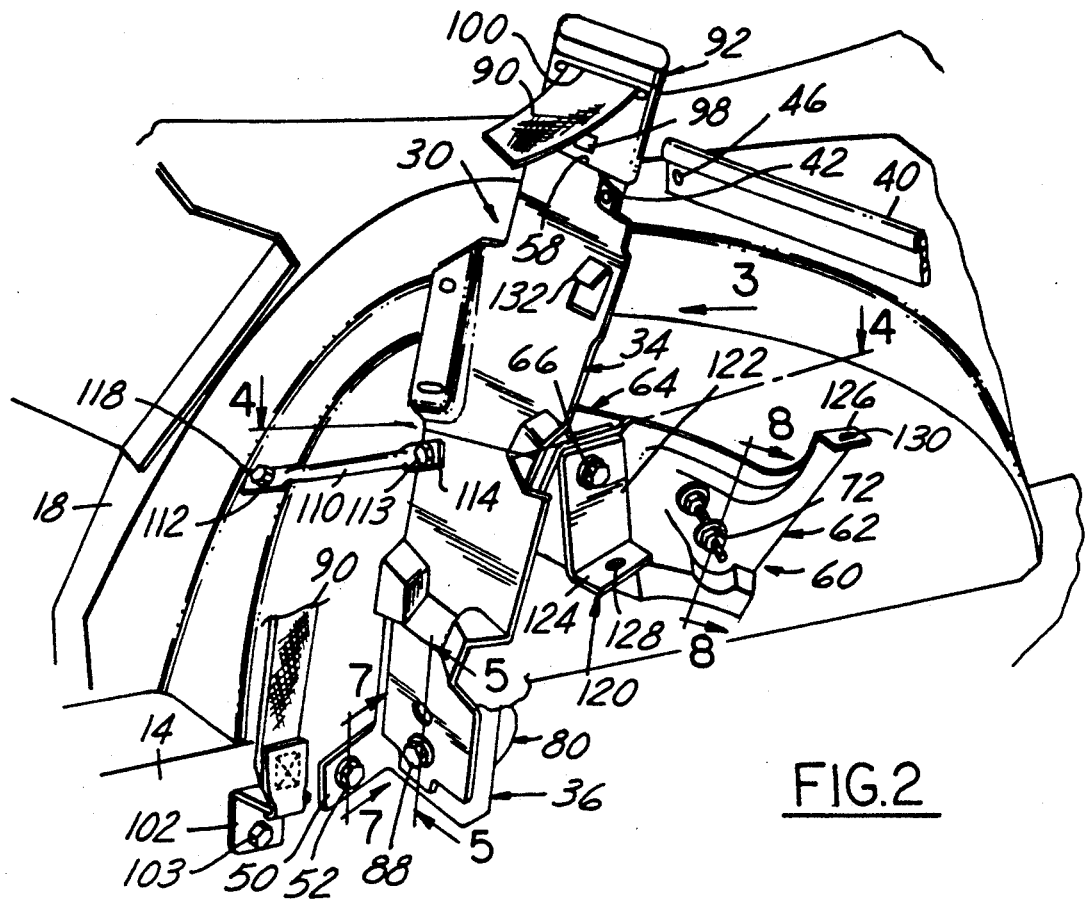
FIG. 2 is a fragmentary perspective view showing the right hand portion of the body looking rearwardly toward an associated portion of the structural sub-assembly together with portions of its seat belt restraint anchors.
Figure 3:
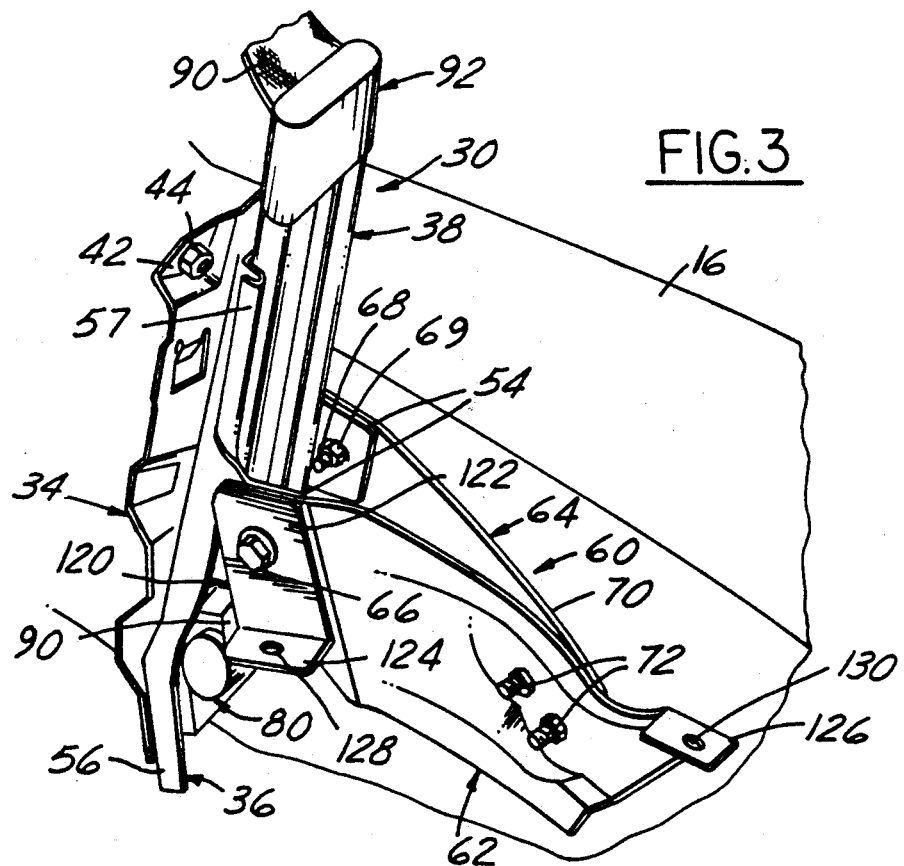
FIG. 3 is a fragmentary perspective view similar to FIG. 2 looking forwardly toward the right hand body showing the aft side of the structural sub-assembly.

Referring to FIGS. 2 and 3 the composite pillar 30 comprises a seat attaching vertically elongated front panel member 34, an intermediate anchor panel member 36, and an aft channel member 38 suitably secured in flatwise abutment as by welding. The aft channel member has, in the cross-sectional view of FIG. 4, the general shape of a guide channel defined by a forward planar web 38a and inturned radiused side webs 39 defining a vertically extending shoulder belt passage.

Figure 11:
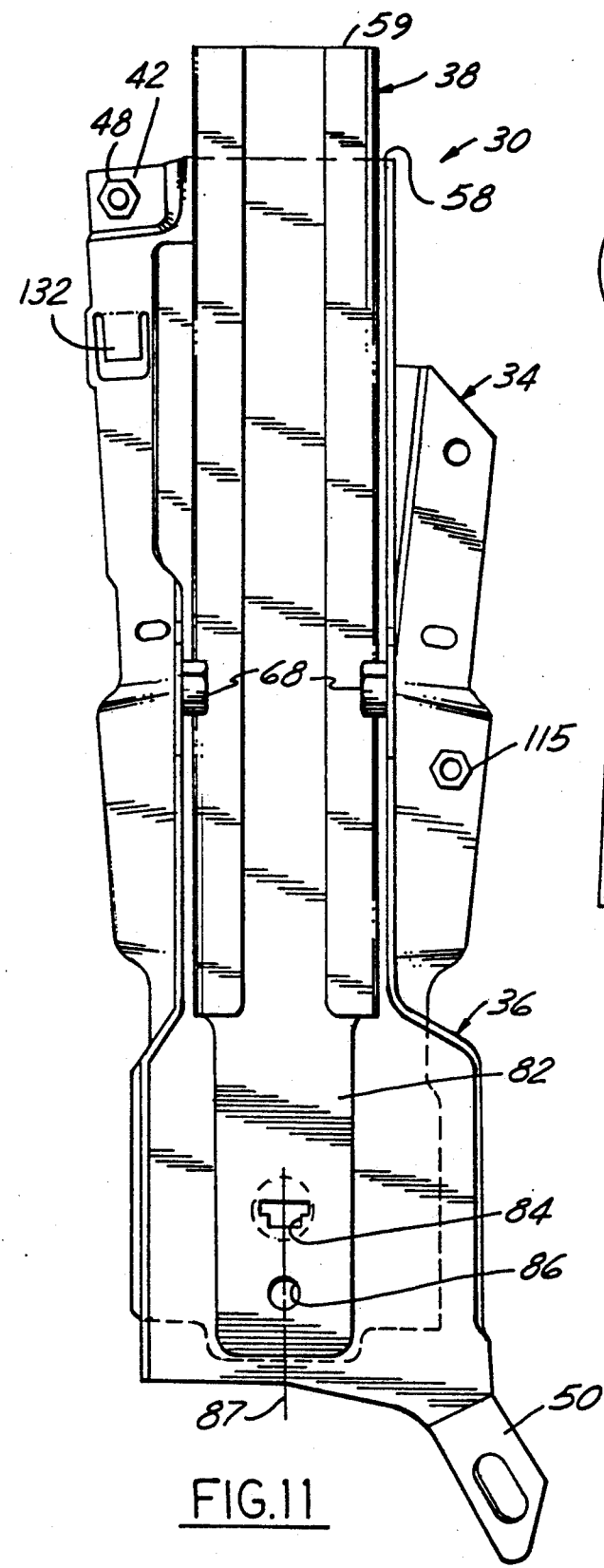
FIG. 11 is an enlarged aft detail view of the composite pillar of FIG. 9.

As best seen in FIGS. 10 and 11 the three pillar members are preferably formed from sheet steel and are substantially vertically coextensive with each other. It will be noted in FIG. 9 that the aft channel member projects upwardly beyond both the front panel member and the anchor panel member for a reason to be explained.

With reference to FIG. 1 the upper ends of the composite pillars are shown tied together or interconnected by a horizontally extending stabilizer or tie bar, generally indicated at 40. In the preferred arrangement an upper inboard forwardly stamped or projecting corner segment 42 of each forward panel 34 is provided with a weld nut 44 on its aft surface, as seen in FIG. 3. The tie bar 40 is shown in FIG. 2 having a mounting hole 46 at each end adapted to receive a machine bolt 48 (FIG. 1) for threaded reception in its associated weld nut 44 as depicted in FIG. 3.

FIG. 1 shows the composite pillars each having a lower terminus in the form of an obliquely downwardly and outwardly projecting apertured wing portion 50 extending from the outboard lower end corner of each intermediate anchor panel member 36. Each lower terminus apertured wing 50 is anchored to its associated floor pan side reinforcement toe plate portion 14 by suitable fastener means such as machine bolt 52.

As best seen in FIG. 3 the composite pillar 30 has a central connection comprising a pair of rearwardly projecting parallel attachment ear portions 54 formed as integral extensions of respective aft-turned stiffener flanges 56 coextensive with each side of an assoxiated intermediate anchor panel member 36. It will be noted in FIG. 3 that the upper portion of anchor member side flanges 56 are each formed with a longitudinally extending forwardly projecting return-bent lip 57 providing increased bending strength to the anchor panel member 36 and consequently to the composite pillar 30.

As viewed in FIGS. 9 and 10 the aft channel member 38 is shown extending a predetermined dimension above upper edge 58 of the anchor panel member 36 such that upper end 59 of each aft channel member 38 positioned just below upper horizontal edge 61 of the vehicle seat back 11.

FIGS. 2 and 3 disclose each pillar porvided with a generally V-shaped downwardly and rearwardly angled mirror image trailing braces 60. Each brace comprises a pair of inboard 62 and outboard 64 rearwardly convergent sheet metal straps defining a pair of laterally spaced forward ends. Each inboard strap 62 has its forward end secured to an associated anchor member inboard midpoint attachment ear portion 54 by a bolt 66 extending through hole 67 (FIG. 10). Each outboard strap 64 has its forward end secured to an associated outboard attachment ear portion 54 by a bolt 68. The bolts 66 and 68 are each threaded into an associated weld nut 69.

The inboard strap 62 and outboard strap 64 are shown in FIG. 4 merging so as to provide an arcuate-shaped aft doubler portion 70 complementary curved to mate with the opposed contour of the rear wheelhouse inner panel 16. A pair of bolts 72 extend through the wheelhouse inner panel 16 and are threadably anchored in their associated doubler portion 70 of the straps 62 and 64.

With reference to FIGS. 2 and 3 it will be seen that a conventional shoulder belt retractor 80 is fixedly secured to the lower rearwardly facing end of the composite pillar 30. The retractor 80 is mounted on the rearward face of aft panel lower tongue extension 82 (FIG. 11). An example of one type of restraint belt retractor suitable for use with the present invention is disclosed in U.S. Pat. No. 4,026,494 issued May 31, 1977 to Tanka the disclosure of which is incorporated by reference herein.

In the preferred embodiment the retractor 80 is readily secured by means of an upper T-shaped through slot or keyway 84 and lower threaded bolt hole 86, adapted to receive a load bearing bolt 88, symmetrically aligned on a vertical centerline 87 (FIG. 11) of the composite pillar 30. Upon a complementary integral T-shaped tong or key 89, integral with retractor base wall 85 (FIG. 5) being received in its associated keyway 84 the bolt 88 (FIG. 2) fixedly secures the retractor 80 on the aft side of the composite pillar 30.

Figure 13:
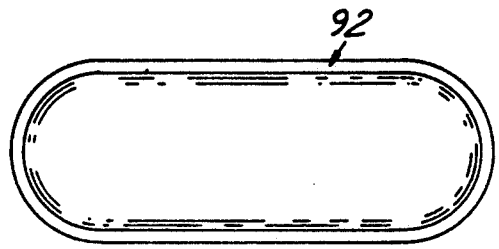
FIG. 13 is an enlarged top detail view of the top closure of FIG. 12.

As seen in FIGS. 3 and 4 the unique composite pillar 30 enables shoulder belt 90 to be guided upwardly from the retractor 80 within the confines of the suitably configured guide channel portion of the aft member 38 for reception into lower open end of a tubular sleeve snap-on trim closure 92 preferably formed from a suitable plastic material. It will be noted in FIGS. 12, 13 and 14 that the trim closure 92 has an elongated oval shape in horizontal cross section configured for snug telescopic reception on the upper free end portion of each of the aft members 38 and 38'. As seen in the exploded view of the composite pillar 32 in FIG. 1 the upper free end portion of member 38' has an axial height such that it extends a predetermined dimension above upper edge 94' of its associated forward panel 34'.

Figure 12:
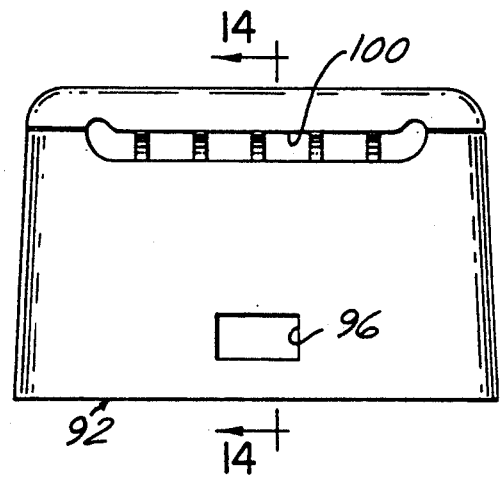
FIG. 12 is an enlarged front detail view of the top closure adapted to be received on the upper end of each pillar.
Figure 14:
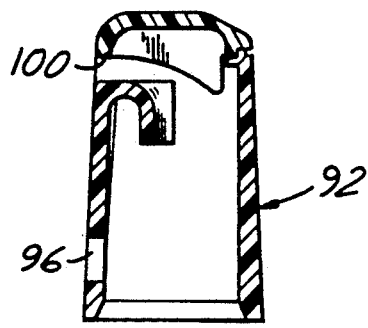
FIG. 14 is a vertical sectional view taken on the line 14—14 of FIG. 12.

The trim closure 92' is shown in FIG. 12 with its forward facing side formed with a rectangular aperture 96 adapted for locking engagement with a complementary resilient clip 98. It will be seen in FIGS. 9 and 10 that the clip 98 includes an upper shield portion fitted on the upper free edge of the aft channel member 38 and is suitably secured thereto as by welding. The identical trim closures 92 and 92' are each respectively formed with a transverse belt passage or slot 100 and 100' therethrough positioned a slight distance above the channel member upper edge 59 which upper edge 59 engages horizontal internal stop edge 99 of the trim closure 92 (FIG. 14).

As see in FIG. 2 after the belt 90 is fed through the trim closure slot 100 and a passage in a tongue plate, slidably positioned on the shoulder belt (not shown), the belt's free lower end is turned back and stitched through an opening in belt fitting 102. A bolt 103 secures the fitting 102 to its associated right hand toe plate portion 14 of the floor pan.

The add-on dual passenger shoulder belt frame arrangement of FIG. 1 shows an installation adjustment rod member 110 having one outboard flattened end 112 bolted to the interior of the right hand wheelhouse inner panel 16. The rod member 110 has a bolt 113, extending through its other inboard flattened end 114, bolted to the outboard edge of the composite pillar front panel member 34 by means of weld nut 115 shown in FIG. 11. The single rod member 110 provides temporary initial rigid alignment for the shoulder belt support frame arrangement during assembly line installation. It will be noted in FIG. 4 that the bar member outboard flattened end 112 is provided with an elongated adjustment slot 116 enabling the installer to correctly align the add-on support arrangement prior to tightening bolt 118. Once the shoulder belt restraint support arrangement is installed, however, the bar member 110 is not required to maintain the structural integrity of the add-on structure.

In FIGS. 2, 3, and 4 there is shown an L-shaped bracket 120 having an upstanding leg flange portion 122 fixed to the inboard brace 62 by means of bolt 66. Each of the pair of L-shaped brackets have a foot flange portion 124 defining, with their associated inboard brace aft support flange portions 126, a generally horizontal plane. It will be appreciated that only the right hand L-shaped bracket 120 and its associated aft support flange 126 are shown in the drawings. Thus, the pair of foot flange portions, each having a hole 128 therein, and the pair of aft support flange portions 126, each having a hole 130 therein, are adapted to support a suitable sound absorbing barrier member (not shown) thereon.

The pillars 30 and 32 also provide support for the vehicle seat back 11 by means of the forward members 34 and 34'. As seen in FIG. 1 each of the pillar forward members are formed with mirror image lanced-out tabs 132 adapted to engage cooperating apertures in the seat back (not shown) to assist in securing each end of the seat back 11 in fixed relation to the respective pillars.

Although only one embodiment of the invention has been illustrated and described, it is apparent that modifications and variations will readily come to mind of a person skilled in the art which modifications and variations do not fall outside the scope of the invention as defined by the following claims.

What is claimed is:

1. An add-on shoulder belt restraint support arrangement for installation in a convertible-type vehicle wherein the vehicle having a body enclosing a rear passenger compartment adapted for supporting a seat cushion and seat back for a pair of occupants, said compartment defined in part by a body floor pan and a pair of side wheelhouse inner panels extending along an aft portion of the passenger compartment, said add-on shoulder belt restraint support arrangement comprising:

a pair of mirror image composite pillars each rigidly affixed adjacent respective aft corners of the passenger compartment, each said composite pillar projecting upwardly from a lower end thereof adjacent the floor pan to an upper end thereof located adjacent an upper horizontal edge of the rear seat back;

each said composite pillar comprising three vertically elongated substantially coextensive sheet metal members affixed in a flatwise manner defining a forward seat support member, an intermediate anchor member, and an aft member, said aft member, in a cross-sectional view, defining a shoulder belt guide channel having a forward flat web and aft inturned side webs;

a transversely extending horizontal disposed tie bar interconnecting each upper end thereof of said pair of composite pillars;

a shoulder belt retractor rigidly mounted on each said composite pillar adjacent a lower rearwardly facing end portion of an aft channel member;

each said pillar anchor member having, in a cross-sectional view, a U-shape defining aft-turned mirror image side flanges, each said side flange provided with an integral attachment ear extending rearwardly therefrom adjacent the midpoint of an associated anchor member;

an obliquely projecting apertured tail portion formed on a lower outboard end of each said anchor member and adapted for fixed engagement with an associated upstanding side portion of the floor pan;

each said pillar having a generally V-shaped downwardly and rearwardly angled trailing brace, each said brace comprising a pair of inboard and outboard rearwardly convergent sheet metal straps terminating in an aft flatwise merged portion, each said inboard and outboard strap having a forward end secured by fastener means to a respective anchor member ear portion and an aft merged portion secured by fastener means to an associated rear wheelhouse inner panel; and closure trim means received on the upper end of each said composite pillar, each said closure trim means providing belt passage means permitting each said retractor shoulder belt to be fed upwardly for passage through the associated aft member guide channel, the associated closure trim means and over the relevant shoulder of an occupant and being secured to the vehicle body thereby providing a shoulder belt for the occupant.

2. The shoulder belt restraint support arrangement as set forth in claim 1 wherein each said trim means comprising a trim closure in the form of a tubular sleeve body having an open lower end and a closed upper end, each said trim closure suitably configured to be received in snug surrounding relationship on an upper conforming projecting portion of an associated pillar aft channel member.

3. The shoulder belt restraint support arrangement as set forth in claim 2 wherein each said trim closure upper end define a forwardly facing belt passage therethrough permitting each said retractor shoulder belt to be fed upwardly in a respective aft channel member for threadingly guided passage through the associated trim closure open lower end and thence forwardly through a trim closure horizontally disposed belt passage and over the relevant shoulder of an occupant and being secured on an associated side wall portion of the floor pan thereby providing a shoulder belt for each of the rear seat occupants.

4. The shoulder belt restraint support arrangement as set forth in claim 3 wherein a resilient clip affixed on a forward face of each said aft channel member adjacent the upper end thereof, each said trim closure having an aperture in the tubular sleeve body adapted to receive the associated resilient clip upon the trim closure being telescopically received on the respective aft channel member upper end in a locked manner.

5. The shoulder belt restraint support arrangement as set forth in claim 1 wherein an installation rod member has one end fastened to one side portion of the vehicle body and the other end fastened adjacent a midpoint portion of an associated composite pillar, and wherein said rod member has an adjustment slot at one end enabling the installer to temporally retain said support arrangement in a predetermined position by means of a fastener received in said adjustment slot prior to fixedly securing the support arrangement in the vehicle body.

6. The shoulder belt restraint support arrangement as set forth in claim 1 wherein each said pillar forward member is provided with attachment means adapted to engage an end portion of the seat back for fixedly supporting the seat back on the vehicle body.

* * * * *

UNITED STATES PATENT AND TRADEMARK OFFICE
CERTIFICATE OF CORRECTION

PATENT NO. : 5,207,453
DATED : May 4, 1993
INVENTOR(S) : Stedman, et al

It is certified that error appears in the above-indentified patent and that said Letters Patent is hereby corrected as shown below:

ON THE TITLE PAGE, in Assignee item #73, insert --Chrysler Corporation--

Signed and Sealed this

Fifth Day of July, 1994

Attest:

BRUCE LEHMAN

Attesting Officer

Commissioner of Patents and Trademarks